(12) United States Patent
Cheng

(10) Patent No.: US 8,670,230 B2
(45) Date of Patent: Mar. 11, 2014

(54) HANDHELD DEVICE DOCKING STATION

(75) Inventor: Chin-Hung Cheng, New Taipei (TW)

(73) Assignee: Lucent Trans Electronic Co., Ltd., New Taipei (TW)

(*) Notice: Subject to any disclaimer, the term of this patent is extended or adjusted under 35 U.S.C. 154(b) by 242 days.

(21) Appl. No.: 13/416,749

(22) Filed: Mar. 9, 2012

(65) Prior Publication Data

US 2013/0027871 A1   Jan. 31, 2013

(30) Foreign Application Priority Data

Jul. 28, 2011   (CN) ...................... 2011 2 0270496 U

(51) Int. Cl.
    *G06F 1/16*   (2006.01)
(52) U.S. Cl.
    USPC ...................... 361/679.41; 710/303
(58) Field of Classification Search
    USPC ...................... 361/679.41; 710/303
    See application file for complete search history.

(56) References Cited

U.S. PATENT DOCUMENTS

| | | | | |
|---|---|---|---|---|
| 6,483,698 B1* | 11/2002 | Loh | ............... | 361/679.41 |
| 7,800,896 B2* | 9/2010 | Takizawa | ............... | 361/679.41 |
| 8,145,821 B2* | 3/2012 | Mead et al. | ............... | 710/303 |
| 8,182,426 B2* | 5/2012 | Zhao et al. | ............... | 600/437 |
| 8,325,476 B2* | 12/2012 | Huang et al. | ............... | 361/679.41 |
| 2002/0117996 A1* | 8/2002 | Cheng | ............... | 320/114 |
| 2003/0095380 A1* | 5/2003 | Chen et al. | ............... | 361/686 |
| 2010/0188808 A1* | 7/2010 | Howarth et al. | ............... | 361/679.41 |
| 2012/0075793 A1* | 3/2012 | Chien et al. | ............... | 361/679.41 |
| 2013/0039521 A1* | 2/2013 | Zhou et al. | ............... | 381/333 |

* cited by examiner

*Primary Examiner* — Lisa Lea Edmonds
(74) *Attorney, Agent, or Firm* — Abe Hershkovitz; Hershkovitz & Associates, PLLC

(57) ABSTRACT

A handheld device docking station has a base, two supporting arms and a pillow. The base has a socket. The socket has a flat bottom. Each supporting arm is formed on the base and has a first assembling part and a supporting plane. The supporting plane is in front of the supporting arm. The pillow is pivotally connected to the first assembling parts of the supporting arms. The pillow has a first surface and a second surface. By rotating the pillow to make the first surface face forward or make the second surface face forward to protrude from the supporting plane, the docking station is adapted for multiple handheld devices in different thicknesses.

8 Claims, 6 Drawing Sheets

HANDHELD DEVICE DOCKING STATION

BACKGROUND OF THE INVENTION

1. Field of the Invention

The present invention relates to a docking station, and more particularly to a handheld device docking station.

2. Description of Related Art

With the rapid development of technologies, people have more and more various entertainments. Especially, handheld devices, such as portable media players, smart phones and pads, are developed in an instant.

Hence, there are various related products for the handheld devices. For example, a smart phone docking station is one of the related products. A smart phone can be charged and communicate with a computer via the smart phone docking station.

However, the smart phone docking station may not match other handheld devices, such as a tablet computer. Because the thickness of the tablet computer is thicker than that of the smart phone, the smart phone docking station does not apply for the tablet computer. The tablet computer needs another docking station that matches the size of the tablet computer.

As a result, the purpose of the present invention is to find a feasible solution to provide a docking station that matches multiple handheld devices.

SUMMARY OF THE INVENTION

With regards to the defects that a docking station is not available for multiple handheld devices, an objective of the present invention is to provide a handheld device docking station that can be adapted for multiple handheld devices.

To achieve the foregoing objective, the handheld device docking station comprises a base, two supporting arms and a pillow.

The base has a top surface and a socket. The top surface has a front side. The socket is formed on the top surface of the base and has a flat bottom.

The two supporting arms are formed on the top surface behind the socket. Each supporting arm has a first assembling part and a supporting plane. The supporting plane is in front of the supporting arm.

The pillow has a body and two second assembling parts. The body has two ends being opposite to each other, a first surface and a second surface being adjacent to the first surface. The first surface and the second surface are formed between the two ends. The two second assembling parts are respectively formed on the ends of the body along a virtual pivot axis and pivotally connected to the first assembling parts of the supporting arms. A distance from the pivot axis to the first surface is shorter than a distance from the pivot axis to the second surface.

By rotating the pillow to make the first surface of the pillow face forward, a thicker handheld device can be securely placed in the socket. By rotating the pillow to make the second surface face forward, a thinner handheld device can be securely placed in the socket. Hence, the docking station in accordance with the present invention is adapted for multiple handheld devices in different thicknesses.

DETAILED DESCRIPTION OF THE PREFERRED EMBODIMENT

Figure 1:
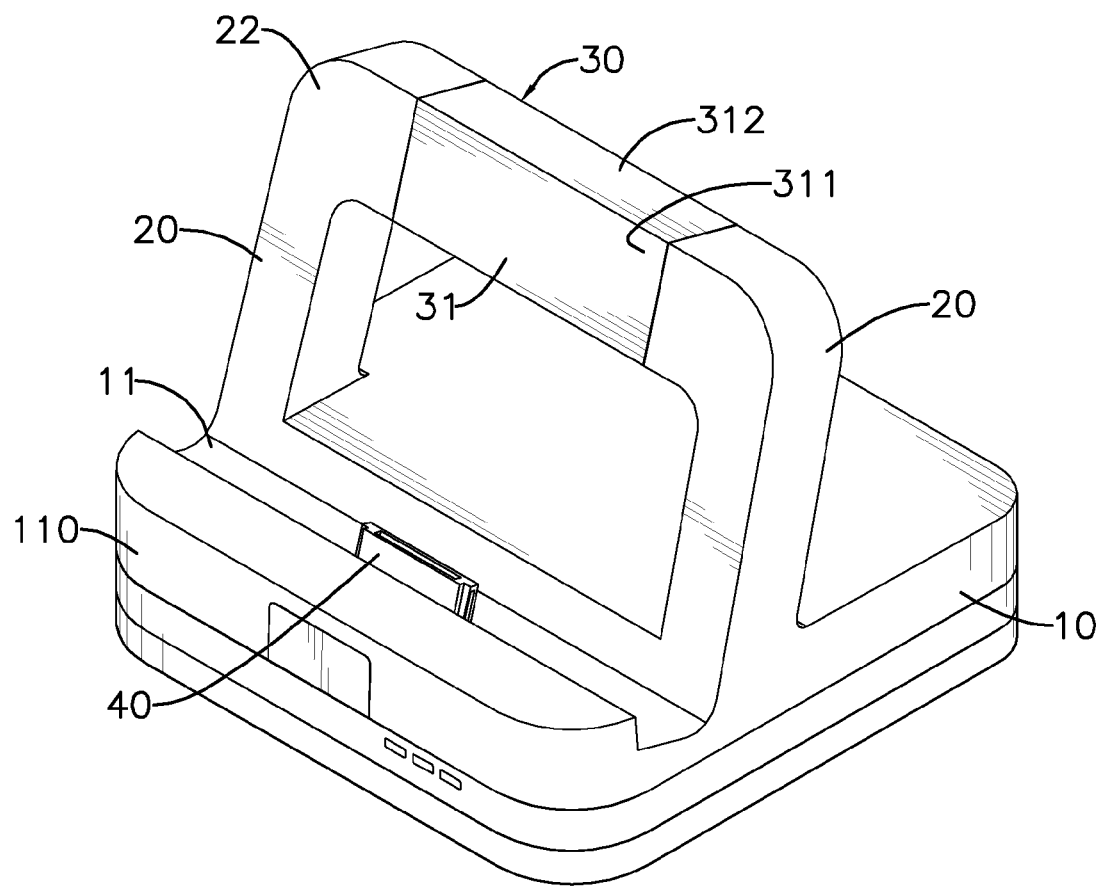
FIG. 1 is a perspective view of the docking station in accordance with the present invention.
Figure 2:
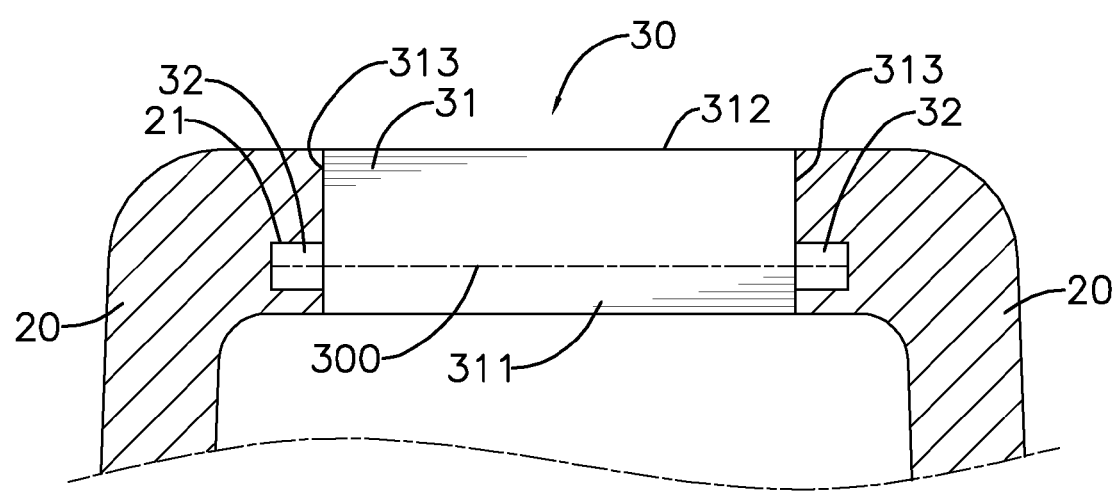
FIG. 2 is a cross-sectional view in partial section of the docking station in accordance with the present invention.
Figure 3:
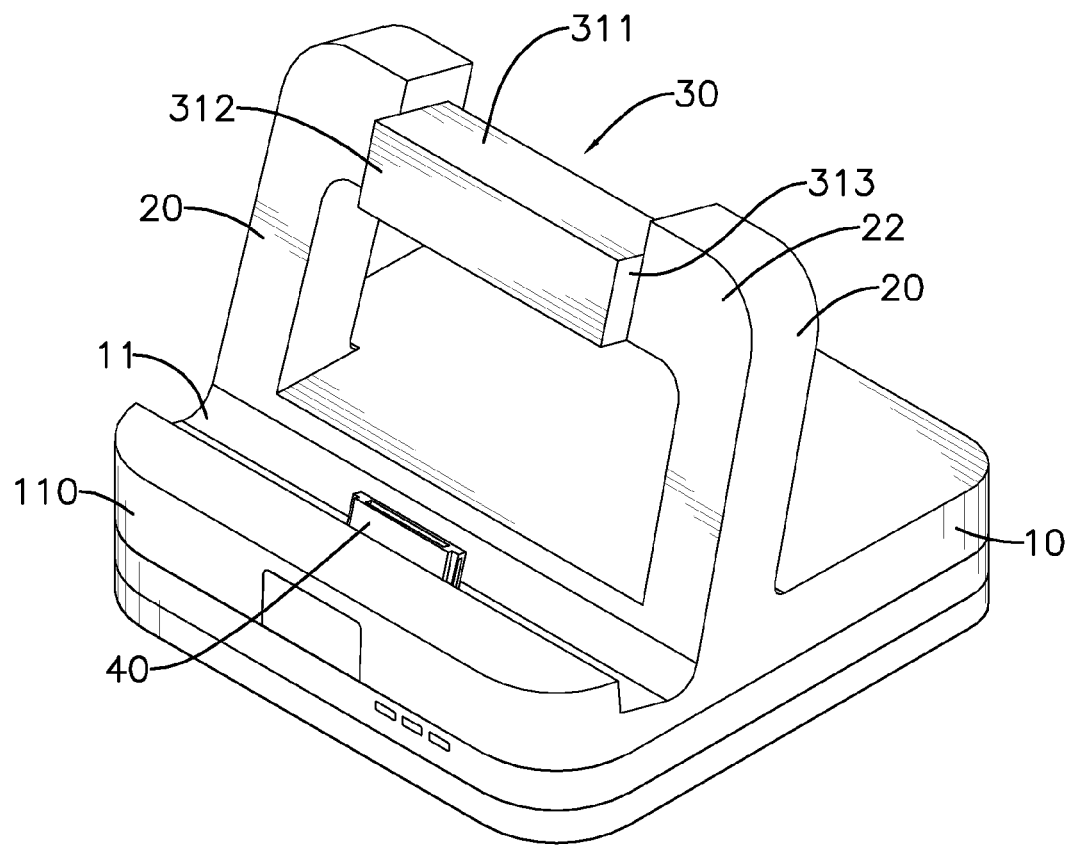
FIG. 3 is a perspective view of the docking station in accordance with the present invention.

With reference to FIG. 1-3, the handheld device docking station in accordance with the present invention comprises a base 10, two supporting arms 20 and a pillow 30.

Figure 4:
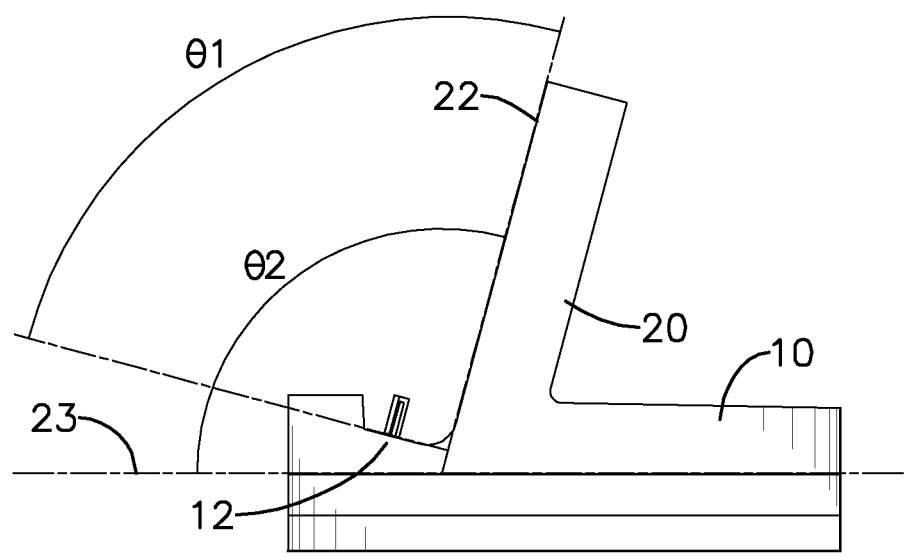
FIG. 4 is a plan view of the docking station in accordance with the present invention.

The base 10 has a top surface and a socket 11. The top surface has a front side 110. The socket 11 is formed on the top surface of the base 10. With reference to FIG. 4, the socket 11 has a flat bottom 12. In addition, the base 10 has a dock connector 40 mounted on the flat bottom 12 of the socket 11. The dock connector 40 is adapted to multiple handheld devices to allow applications, such as charging the handheld device or communicating between the handheld device and a computer, a television or a media player. For example, the dock connector 40 can be an Apple® dock connector that applies to iPhone and iPad.

The two supporting arms 20 are formed on the top surface of the base 10 and behind the socket 11. With reference to FIG. 2, each supporting arm 20 has a first assembling part 21. The first assembling parts 21 of the two supporting arms 20 are opposite to each other. In this embodiment, the first assembling parts 21 are holes. The supporting arms 20 respectively have a supporting plane 22 that is in front of the supporting arms 20. With reference to FIG. 4, an included angle θ1 between the supporting plane 22 and the flat bottom 12 of the socket 11 is about ninety degrees. An included angle θ2 between the supporting plane 22 and a virtual horizontal plane 23 defined at a bottom of the base 10 is larger than ninety degrees.

With reference to FIG. 2, the pillow 30 has a body 31 and two second assembling parts 32. The body 31 has a first surface 311 and a second surface 312 and two ends 313. The two ends 313 are opposite to each other. The first surface 311 and the second surface 312 are formed between the two ends 313. The first surface 311 and the second surface 312 are adjacent to each other. The two second assembling parts 32 are respectively formed on the ends 313 of the body 31 along a virtual pivot axis 300 defined in the body 31. In this embodiment, the second assembling parts 32 are pivots. The second assembling parts 32 are respectively and pivotally connected to the first assembling parts 21 so that the pillow 30 can be pivotally held between the supporting arms 20.

Figure 5:
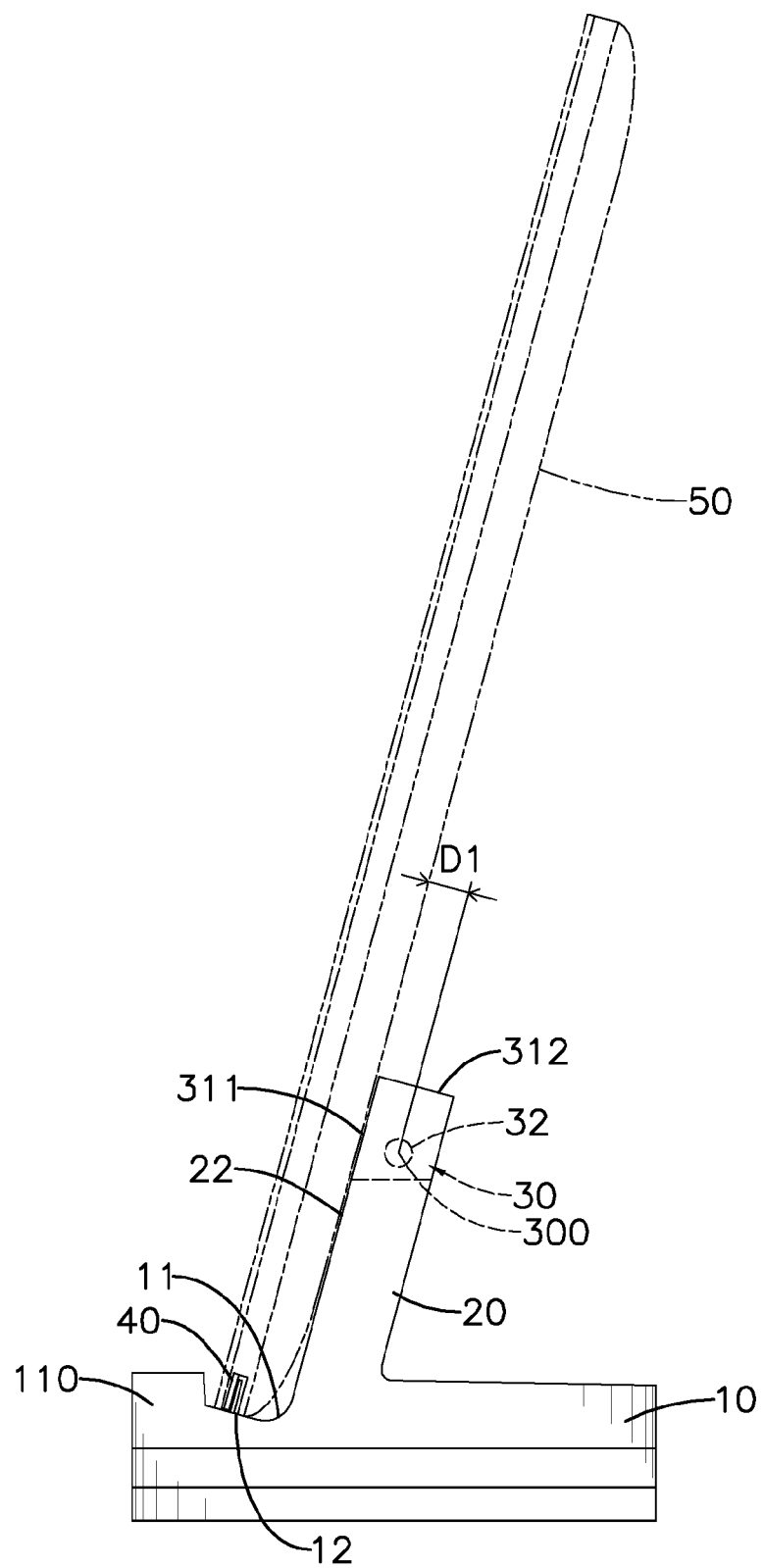
FIG. 5 is an operational view of the docking station in accordance with the present invention.
Figure 6:
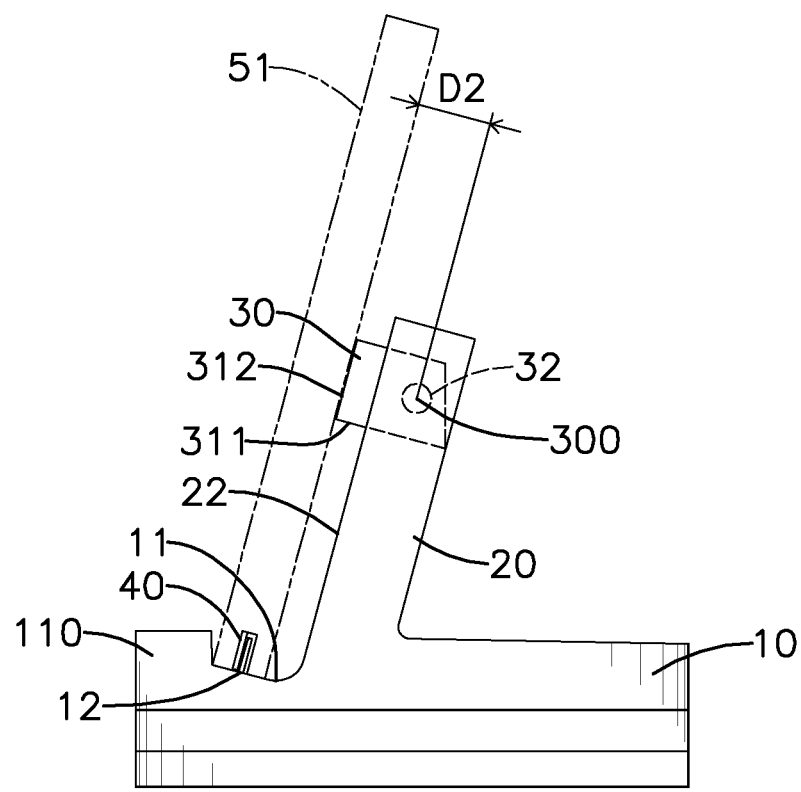
FIG. 6 is an operational view of the docking station in accordance with the present invention.

With reference to FIGS. 5 and 6, a distance D1 from the pivot axis 300 to the first surface 311 is shorter than a distance D2 from the pivot axis 300 to the second surface 312. The docking station in accordance with the present invention has two operating statuses.

Firstly, with reference to FIG. 5, when the pillow 30 is rotated to make the first surface 311 face forward, the first surface 311 and the supporting plane 22 form a smooth plane. If a thicker handheld device, such as a tablet computer 50, is placed in the socket 11 of the base 10, the tablet computer 50 will lean on the first surface 311 of the pillow 30 and the supporting plane 22, so that the tablet computer 50 will be securely mounted on the dock connector 40.

Secondly, with reference to FIG. 6, when the pillow 30 is rotated to make the second surface 312 face forward, the second surface 312 protrudes from the supporting plane 22. If a thin handheld device, such as a smart phone 51, is placed in the socket 11 of the base 10, the smart phone 51 will lean on the second surface 312 of the pillow 30, so that the smart phone 51 will be securely mounted on the dock connector 40.

With the above-mentioned technical features, the docking station can be adapted for multiple handheld devices.

What is claimed is:

1. A handheld device docking station comprising:
   a base having:
      a top surface having a front side; and
      a socket formed on the top surface of the base and having a bottom;
   two supporting arms formed on the top surface and behind the socket, each supporting arm having:
      a first assembling part; and
      a supporting plane being in front of the supporting arm; and
   a pillow having:
      a body having:
         two ends being opposite to each other;
         a first surface formed between the two ends; and
         a second surface formed between and adjacent to the first surface; and
      two second assembling parts respectively formed on the ends of the body along a virtual pivot axis and pivotally connected to the first assembling parts of the supporting arms, wherein a distance from the pivot axis to the first surface is shorter than a distance from the pivot axis to the second surface.

2. The docking station as claimed in claim 1, wherein
   the first assembling parts are holes; and
   the second assembling parts are pivots.

3. The docking station as claimed in claim 2 further comprising a dock connector mounted on the bottom of the socket.

4. The docking station as claimed in claim 3, wherein
   the first surface and the supporting plane form a smooth plane when the pillow is rotated to make the first surface face forward; and
   the second surface protrudes from the supporting plane when the pillow is rotated to make the second surface face forward.

5. The docking station as claimed in claim 2, wherein
   the first surface and the supporting plane form a smooth plane when the pillow is rotated to make the first surface face forward; and
   the second surface protrudes from the supporting plane when the pillow is rotated to make the second surface face forward.

6. The docking station as claimed in claim 1 further comprising a dock connector mounted on the bottom of the socket.

7. The docking station as claimed in claim 6, wherein
   the first surface and the supporting plane form a smooth plane when the pillow is rotated to make the first surface face forward; and
   the second surface protrudes from the supporting plane when the pillow is rotated to make the second surface face forward.

8. The docking station as claimed in claim 1, wherein
   the first surface and the supporting plane form a smooth plane when the pillow is rotated to make the first surface face forward; and
   the second surface protrudes from the supporting plane when the pillow is rotated to make the second surface face forward.

* * * * *